United States Patent [19]
Richter

[11] Patent Number: 5,839,361
[45] Date of Patent: Nov. 24, 1998

[54] COMBINATION GRILL AND GRIDDLE COOKING SURFACE

[76] Inventor: John T. Richter, 2138 Clarkston La., Union, Ky. 41091

[21] Appl. No.: 889,715

[22] Filed: Jul. 8, 1997

Related U.S. Application Data

[63] Continuation of Ser. No. 583,426, Jan. 5, 1996, abandoned.

[51] Int. Cl.[6] .................................................. F24C 15/16
[52] U.S. Cl. .......................... 99/422; 99/445; 99/449; 99/450; 126/25 R; 126/9 R; 126/337 R; 126/41 R
[58] Field of Search ................... 99/422, 449, 448, 99/450, 445, 425, 339; 126/25 R, 9 R, 337 R, 41 R

[56] References Cited

U.S. PATENT DOCUMENTS

| | | | |
|---|---|---|---|
| D. 230,371 | 2/1974 | Philipe | D7/2 |
| D. 251,176 | 2/1979 | Lewis | D7/87 |
| D. 286,494 | 11/1986 | Lastuck | D7/323 |
| D. 351,083 | 10/1994 | O'Brien et al. | D7/363 |
| 2,040,996 | 5/1936 | Hungerford | 99/422 |
| 2,606,843 | 7/1952 | Davis | 99/450 |
| 2,816,538 | 12/1957 | Miller et al. | 126/25 |
| 3,490,359 | 1/1970 | Seitz | 99/400 |
| 3,937,138 | 2/1976 | Tidwell | 99/450 |
| 4,434,780 | 3/1984 | Hepner | 99/449 X |
| 4,930,491 | 6/1990 | Purello | 99/425 X |
| 5,277,106 | 1/1994 | Raymer et al. | 99/447 |
| 5,404,801 | 4/1995 | Holland | 99/450 X |
| 5,490,452 | 2/1996 | Schlosser et al. | 99/449 X |

*Primary Examiner*—Reginald L. Alexander
*Attorney, Agent, or Firm*—Wood, Herron & Evans, LLP

[57] ABSTRACT

A cooking surface for use with cooking kettles, such as outdoor grills, is disclosed. The cooking surface is made from a single sheet of stainless steel of sufficient thickness to prevent warping under normal cooking temperatures. The cooking surface has a grill section with a plurality of parallel slots cut into the stainless steel to emulate a rack type cooking surface and a griddle section that is substantially solid. Two embodiments of the combination griddle and grill cooking surface are disclosed, one directed to a rectangular kettle and one directed to a circular kettle. An adaptable embodiment of the rectangular cooking surface having extendable slide bars to fit various size cooking kettles is also disclosed.

10 Claims, 4 Drawing Sheets

COMBINATION GRILL AND GRIDDLE COOKING SURFACE

This application is a file wrapper continuation of application Ser. No. 08/583,426 filed on Jan. 5, 1996 now abandoned.

TECHNICAL FIELD

This invention relates generally to stoves and furnaces and, more particularly, to cooking surfaces for kettle type cooking apparatuses.

BACKGROUND OF THE INVENTION

The preparation of food and implements used therefor have spawned many developments and innovations. Cooking itself as a form of preparing food has undergone many changes, accountable in large part to the subtle differences in the processes of cooking and the significant impact those differences have on the taste and flavor of the final product. One recent change has seen the popularity of outdoor barbecue grills/cooking kettle type apparatuses enjoy a huge increase. These cooking kettle apparatuses typically include means for containing a heat source and means for maintaining the food being prepared near the heat source. The distinctive flavor of food prepared in this manner, as well as the ambiance associated with preparing food outdoors, has made the use of outdoor grills desirable and prevalent, to wit the presence of grills in most homes and accounting for sales of more than 2 million units per year.

Food is prepared in outdoor cooking kettle type apparatuses by maintaining it over a heat source on a cooking surface in an arrangement that allows direct exposure of the food to the heat source. Particularly in the preparation of meat such as steaks, hamburger patties, pork chops, etc., the direct exposure of the meat to the heat source produces a barbecued flavor, the drippings from the meat falling onto the heat source or an intermediate heat distribution device creating flare-ups and smoke that flavor the meat. The burning of the meat drippings produces an atmosphere of smoke and vaporized fats that is absorbed and flavors the food being prepared.

Outdoor cooking kettles use a variety of heat sources to prepare food including charcoal, gas and electric heating elements. In many of those utilizing gas and electric heat sources, an intermediate heat distribution device, such as lava rocks or a conductive heat distribution plate, is interposed between the heat source and the cooking surface to provide more uniform distribution of heat.

The cooking surface utilized with outdoor cooking kettle apparatuses is typically a grating type rack comprising multiple individual bars welded together to form a surface which will support larger food items that can be easily turned and moved without breaking apart. The prior art assemblies allow the food to be exposed to the heat source, and the drippings and smoke associated therewith, through the rack, thus achieving the desired result of flavoring the food. Examples of prior art racks are shown in FIG. 3 for a rectangular cooking kettle and in FIG. 4 for a circular cooking kettle.

Prior art racks are effective in that they maintain the food above the heat source and allow exposure of the meat to the heat source, but a variety of problems and disadvantages are associated with such prior art racks. First and foremost, these racks have a short useful life which has had the effect of creating a large secondary market for replacement racks necessitated when the original rack supplied with the cooking kettle wears out. The susceptibility of the rack and the welded rods to rust and corrosion has shortened the life span and made it commonplace for many users to replace the rack every year. In addition, the construction of the rack from welded together metal rods results in an assembly that is difficult to adequately clean, typically requiring heavy steel brushes and a good deal of labor to remove the cooked on fats and oils. In addition, the prior art racks have the disadvantage that many foods such as fish, which breaks apart easily, and vegetables, which are small and break apart easily, cannot be prepared on them because of the susceptibility of such items to fall through the rack.

Another disadvantage of the prior art racks is that they are made to fit only a cooking kettle of a specific size and are not adaptable. A wide variety of sizes of rectangular cooking kettles are available, but there is not a uniform size for the cooking surface associated therewith such that many different sizes of racks are used and replaced.

The principles of the present invention contemplate a cooking surface formed from a single piece of material as opposed to the multiple welded together rods of prior art racks. Construction of a cooking surface from a single piece of material, heretofore formed by punching or stamping the material with a press, has not been feasible because such a cooking surface must be of sufficient thickness to prevent warping under normal cooking temperatures of 250° F. to 800° F., the required thickness of stainless steel of $3/16$ inch being too great for presses that produce items of this size and arrangement of many closely spaced slots. Recent advancements in the use of lasers and high definition plasma cutting devices have made the fabrication of many items from steel and alloys more feasible. As they relate to the present invention, the advancements in cutting technologies allows the affordable fabrication of a cooking surface from a single piece of material, such as stainless steel, of sufficient thickness to eliminate warping under normal cooking temperatures.

SUMMARY OF THE INVENTION

It is an object of the present invention to provide a cooking surface for use with an outdoor type cooking kettle that can be utilized to prepare a variety of types of foods including those that cannot be prepared on prior art cooking racks due to size or instability during preparation.

Another object of the present invention is to provide a cooking surface having a solid griddle type section and a slotted grill type section for use with outdoor cooking kettles.

Another object of the present invention is to provide a cooking surface that is easily cleaned and maintained.

It is yet a further object of the present invention to provide a cooking surface formed from a single piece of material that will not warp or otherwise be affected by normal cooking temperatures associated with an outdoor cooking kettle.

Still another object of the present invention is to provide an adjustable cooking surface that can be adapted to fit a variety of sizes of cooking kettles.

It is another object of the present invention to provide a cooking surface constructed from a single piece of material in which elongated slots have been formed by using a laser cutting device. How these and other objects are accomplished will become apparent from the following description and drawings.

The present invention comprises a cooking surface for use with an outdoor type cooking kettle. Two specific embodiments are contemplated for the present invention, a round surface and a rectangular surface, for use with corresponding cooking kettle arrangements. An advantage of the rectangular embodiment of the present invention is that it is adjustable to fit a variety of cooking kettle sizes, thereby eliminating the need to maintain a variety of sizes of cooking racks. The circular embodiment of the present invention is particularly advantageous in that handles attached thereto are formed from the same single piece of material as the rest of the cooking surface, cut by a laser or high definition plasma device and bent upwardly to provide handles while minimizing the manufacturing steps required.

Both embodiments of the present invention incorporate multi-use cooking capabilities, each embodiment having a solid griddle section and a slotted grill section. In both embodiments the cooking surface is formed from a single piece of material, a plurality of parallel slots having been cut therein to form a grill section emulating a rack type cooking surface. The material from which the cooking surface of the present invention is formed is of sufficient thickness or supported rigidity to eliminate warping under normal cooking temperatures associated with an outdoor cooking kettle.

The cooking surface of the present invention is easy to clean and maintain as a result of its construction form a single piece of rust resistant and corrosion resistant stainless steel.

The cooking surface disclosed herein is advantageous in that it allows preparation of foods such as fish and vegetables that could not otherwise be prepared on prior art cooking racks.

DETAILED DESCRIPTION OF THE INVENTION

Figure 1:
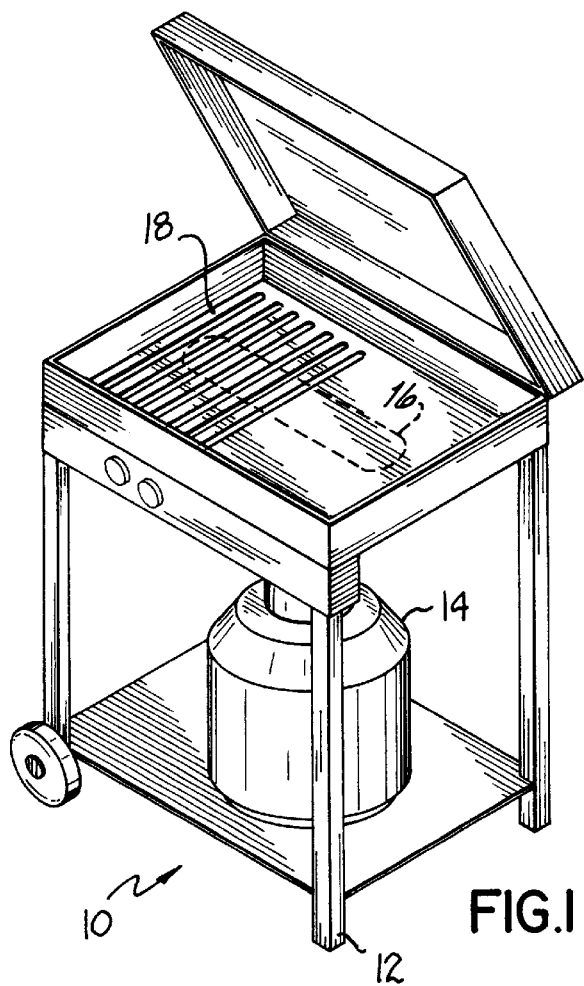
FIG. 1 is a perspective view of a rectangular cooking kettle utilizing the rectangular embodiment of the cooking surface of the present invention.

Referring first to FIG. 1, a common outdoor rectangular cooking kettle 10 is shown. It includes supporting legs 12, a gas source 14, and a heat source 16 (shown in phantom) comprising a gas burner at which gas communicated from the gas source 14 is ignited. Food is cooked as result of being positioned on a cooking surface 18 and maintained over the burner 16.

Figure 2:
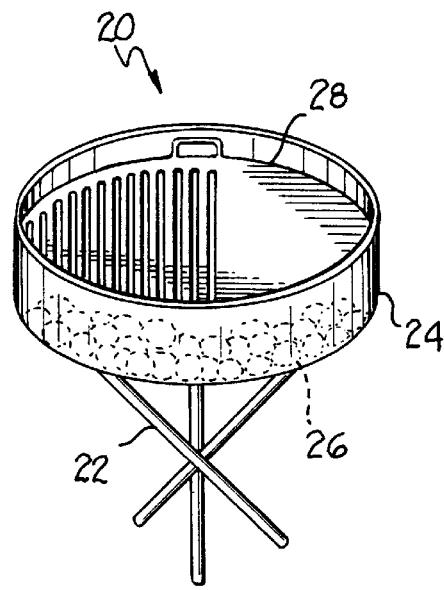
FIG. 2 is a perspective view of a circular cooking kettle utilizing the circular embodiment of the cooking surface of the present invention.

A circular cooking kettle 20 is shown in FIG. 2 having supporting legs 22, a kettle 24 for holding a heat source 26, which comprises burning charcoal in the embodiment shown, and a cooking surface 28 on which food being prepared in a position over the heat source 26.

Figure 3:
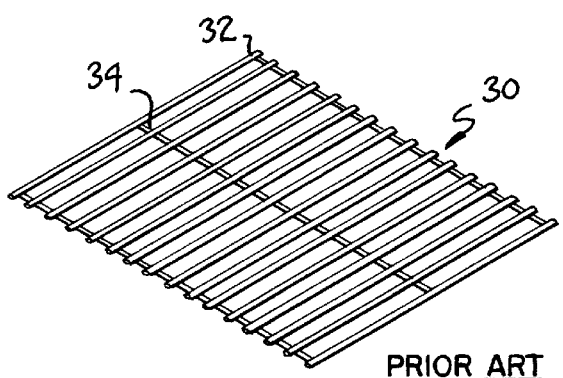
FIG. 3 is a perspective view of a prior art rack type cooking surface utilized with a rectangular cooking kettle.
Figure 4:
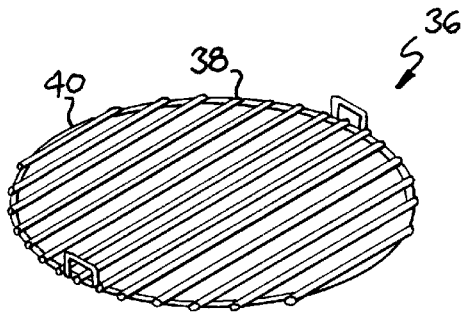
FIG. 4 is a perspective view of a prior art rack type cooking surface utilized with a circular cooking kettle.

A prior art cooking surface comprising a rectangular rack 30, shown in FIG. 3, comprises a plurality of parallel laterally oriented rods 32 welded to parallel longitudinally oriented rods 34. Another prior art cooking surface comprising a circular rack 36 is shown in FIG. 4. The circular rack 36 includes a plurality of parallel rods 38 arranged on and welded to a perimeter ring 40. In addition, upstanding handles 42 are welded to the ring 40.

Figure 5:
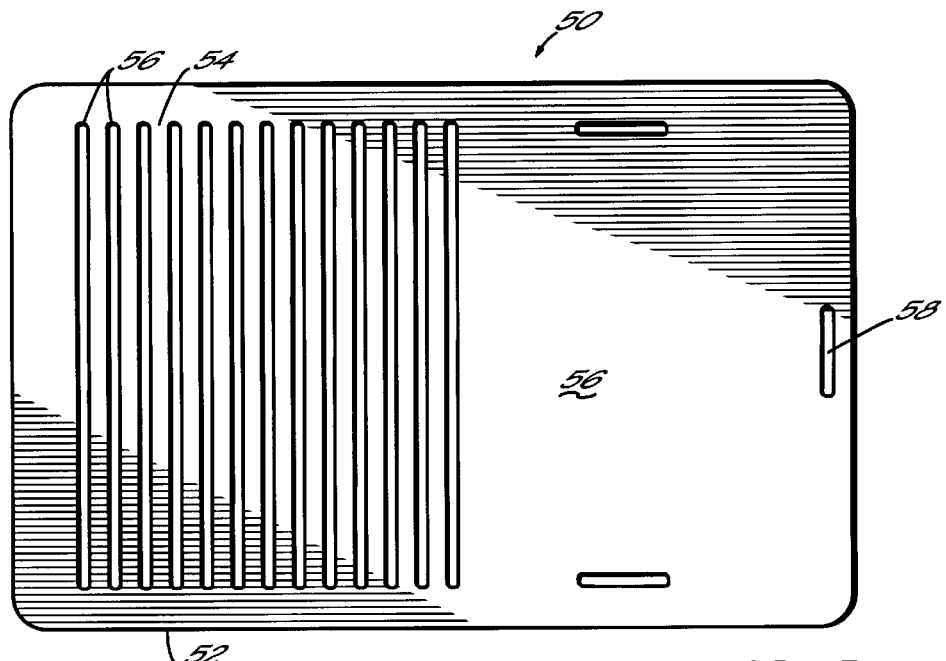
FIG. 5 is a top plan view of the rectangular embodiment of the cooking surface of the present invention.
Figure 6:
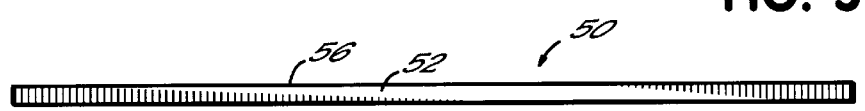
FIG. 6 is a side view of the cooking surface depicted in FIG. 5.

The rectangular cooking surface 50 of the present invention is disclosed at FIG. 5. It includes a single piece of material 52 having a grill section 54, defined by a plurality of parallel slots 56, and a griddle section 58. Ventilation apertures 60 are formed near the perimeter of the griddle section 58 which allows smoke to flow around and flavor food being prepared on griddle section 58. In the most preferred embodiment of the present invention the single piece of material 52 comprises stainless steel which is 3/16 inch thick to prevent warping under exposure to normal cooking temperatures of 250° F. to 800° F. Moreover, in the preferred embodiment the slots 56 are ¼ inch wide rounded slots with their centers being spaced apart by ¾ inches, leaving a strip of stainless between slots of ½ inch width. To assure precision spacing and repeatability, the preferred embodiment of the cooking surface 50 and slots 56 therein are formed by a high wattage laser or high definition plasma cutting device.

Figure 5A:
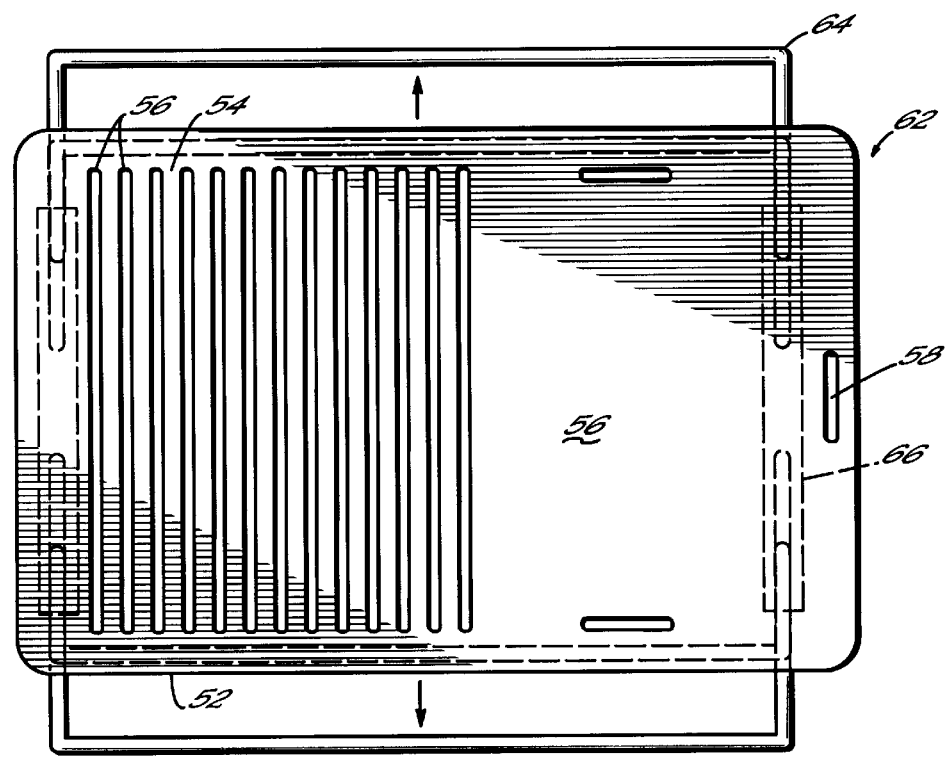
FIG. 5A is a top plan view of the rectangular embodiment of the cooking surface of the present invention incorporating slide bars to fit a variety of different size cooking kettles.
Figure 6A:
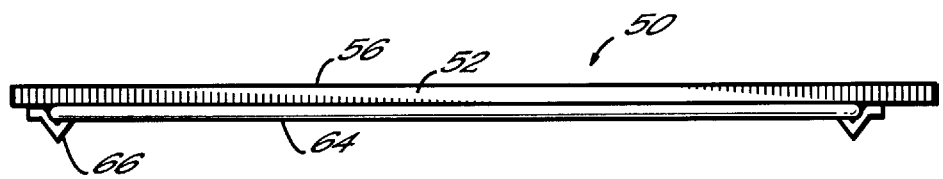
FIG. 6A is a side view of the cooking surface depicted in FIG. 5A.
Figure 5B:
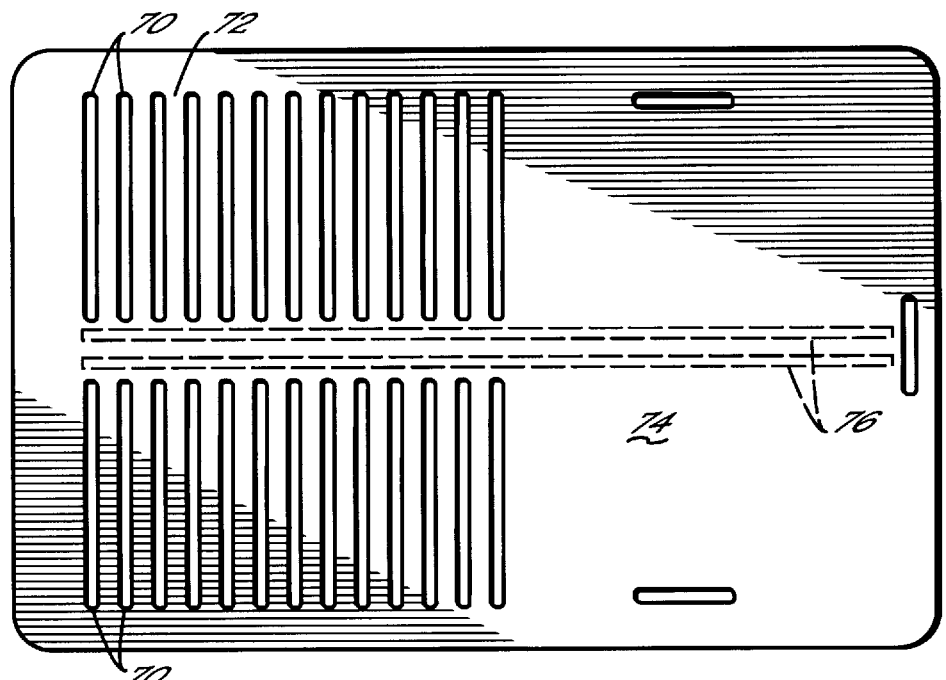
FIG. 5B is a top plan view of the rectangular embodiment of the present invention having stiffeners mounted thereon to prevent warping.
Figure 6B:
FIG. 6B is a side view of the cooking surface depicted in FIG. 5B.
Figure 8:
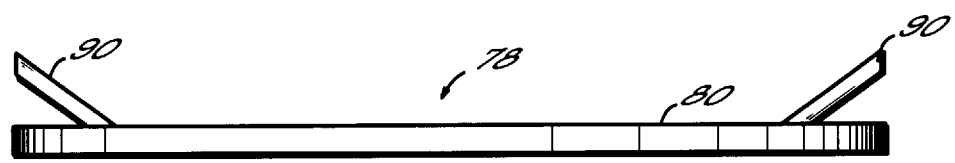
FIG. 8 is a side view of the circular cooking surface depicted in FIG. 7.

The rectangular cooking surface 62 depicted in FIG. 5A incorporates the characteristics of the cooking surface 50 and is, in addition, adjustable to various size rectangular cooking kettles. Means for adjusting the cooking surface 62 to fit various size cooking kettles is provided through the use of extendable slide bars 64 which support the cooking surface 62 on a cooking kettle. Sleeves 66 that are affixed to the underside of the cooking surface 62 receive the slide bars 64, allowing sliding adjustment in the directions shown in FIG. 5A. In operation, the slide bars 64 are extended a sufficient length so that they engage supporting flanges attached to the cooking kettle to hold the cooking surface 62 suspended over the heat source located in the cooking kettle.

In another embodiment of the present invention, a rectangular cooking surface 68 is provided having dual rows of parallel slots 70 with a solid uncut strip 71 formed between the dual rows of slots 70. The cooking surface 68 has a grill section 72 and griddle section 74 similar to the other embodiments of the rectangular cooking surface 50, 62 disclosed herein. Stiffeners 76 are affixed to the underside of cooking surface 68 to improve rigidity and to prevent deformation under normal cooking temperatures. The present invention contemplates the use of stiffeners 76 to reduce the thickness necessary to prevent warping of the cooking surface 68.

Figure 7:
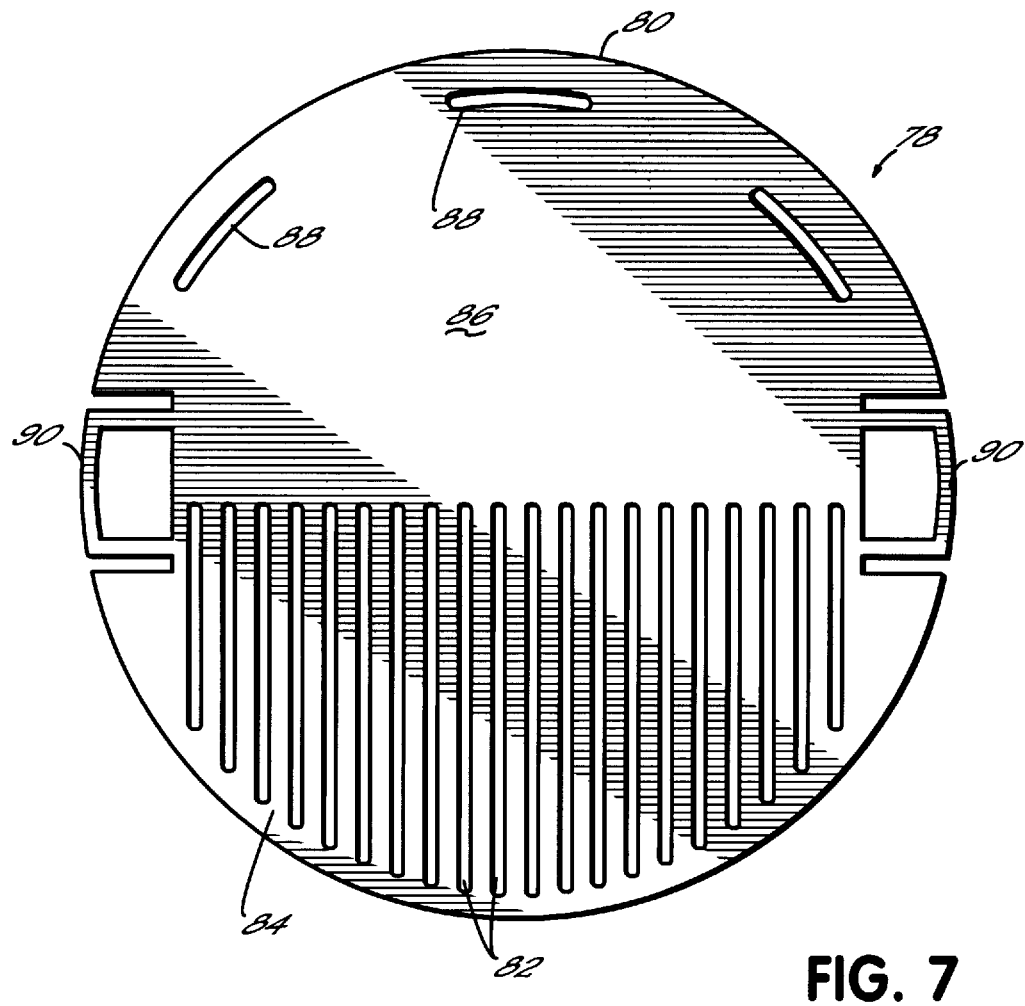
FIG. 7 is a top plan view of the circular embodiment of the cooking surface of the present invention.

Another embodiment of the present invention comprising a circular cooking surface 78 is disclosed and shown in FIG. 7. It is formed from a single piece of material 80 of sufficient thickness to prevent warping under normal cooking temperatures and has a plurality of parallel slots 82 cut therein and extending substantially halfway across the cooking surface 78, thereby defining a grill section 84. A griddle section 86 of the cooking surface 78 is essentially uncut with the exception of ventilation apertures 88. Handles 90 are formed from the single piece of material 80 as the rest of the cooking surface 78 and are bent up at an angle relative to the rest of the cooking surface 78. In the most preferred embodiment of the present invention the single piece of material 80 comprises stainless steel which is 3/16 inch thick to prevent warping under exposure to normal cooking temperatures of 250° F. to 800° F. Moreover, in the preferred embodiment the slots 82 are ¼ inch wide rounded slots with their centers being spaced apart by ¾ inches, leaving a strip of stainless between slots of ½ inch width. To assure precision spacing and repeatability, the preferred embodiment of the cooking surface 78 and slots 82 therein are formed by a high wattage laser or high definition plasma cutting device.

I claim:

1. A cooking surface for use with a cooking kettle wherein food being prepared is positioned over a heat source, said cooking surface comprising:

a unitary, continuous and planar sheet of stainless steel, said planar sheet comprising:

a grill section having a continuous, planar grill surface and having a plurality of elongated parallel slots formed in the grill surface, said slots being open along their lengths;

a griddle section having a continuous, planar griddle surface formed from a solid section of said sheet of stainless steel and being generally free of said slots;

ventilation apertures formed proximate said griddle section which allow smoke to flow around and flavor food being prepared on said griddle section;

said griddle surface and grill surface being contiguous between said griddle and grill sections for providing a warp-resistant cooking surface which may be easily fabricated and maintained.

2. The cooking surface of claim 1 wherein said continuous, and planar sheet of stainless steel is at least approximately 3/16 inch thick.

3. The cooking surface of claim 1 further comprising stiffeners affixed to said sheet of stainless steel.

4. The cooking surface of claim 1 wherein said elongated parallel slots comprise approximately ¼ inch wide rounded slots with centers which are spaced apart by approximately ¾ inches.

5. The cooking surface of claim 1 wherein said cooking surface is rectangular.

6. The cooking surface of claim 1 wherein said cooking surface is circular and wherein said continuous, planar grill surface forms approximately one half of said circular cooking surface and said continuous, planar griddle surface forms approximately another half of said circular cooking surface.

7. The cooking surface of claim 6 further comprising integral handles formed from said sheet of stainless steel.

8. A cooking surface adaptable for use with one of various size cooking kettles wherein food being prepared is positioned over a heat source, said cooking surface comprising:

a continuous and planar surface having an underside, said surface defining a griddle section and a grill section;

said grill section having a plurality of elongated parallel slots formed therein having centers that are spaced apart;

said griddle section comprising a solid section of said surface;

ventilation apertures being formed near the perimeter of said griddle section for allowing smoke to pass to food on said griddle section.

sleeve structures affixed to said underside of said planar surface a supporting element slidably received by said sleeve structures and movable for expanding an effective dimension of said cooking surface for adapting the cooking surface to various sized cooking kettles;

the supporting element comprising an extendable slide bar with two opposed arms which are received by said sleeve structures, said slide bar slidable for increasing the length of the cooking surface with respect to said continuous, planar surface.

9. The cooking surface of claim 8 wherein said elongated slots comprise ¼ inch wide rounded slots with their centers being spaced apart by ¾ inch.

10. A cooking surface for use with a cooking kettle wherein food being prepared is positioned over a heat source, said cooking surface being formed of a unitary, continuous, and planar piece of material and comprising:

a grill section comprising a continuous, planar grill surface having two pluralities of elongated parallel slots formed therein, said plurality of slots separated by a solid section of said piece of material;

a griddle section having a continuous, planar griddle surface formed from a solid section of said single piece of material and being generally free of said slots;

a stiffener affixed to said single piece of material proximate said solid section separating the pluralities of slots;

ventilation apertures formed proximate said griddle section which allow smoke to flow around and flavor food being prepared on said griddle section; and wherein the warp resistance of the cooking surface is improved.

* * * * *